United States Patent [19]

Mead

[11] 4,433,567
[45] Feb. 28, 1984

[54] METHOD FOR WORKING HOLES
[75] Inventor: Albert R. Mead, Setauket, N.Y.
[73] Assignee: Grumman Aerospace Corporation, Bethpage, N.Y.
[21] Appl. No.: 320,842
[22] Filed: Nov. 12, 1981
[51] Int. Cl.$^3$ .............................................. B21D 41/02
[52] U.S. Cl. ........................................ 72/342; 72/370
[58] Field of Search .................... 72/342, 370; 29/447; 285/DIG. 10

[56] References Cited
U.S. PATENT DOCUMENTS

| | | | |
|---|---|---|---|
| 3,388,931 | 6/1968 | Johnson et al. | 29/447 |
| 3,900,939 | 8/1975 | Greacen | 29/447 |
| 3,943,748 | 3/1976 | King, Jr. | 72/370 |
| 4,035,007 | 7/1977 | Harrison et al. | 29/447 |

FOREIGN PATENT DOCUMENTS 647041  2/1979  U.S.S.R. ................................ 29/447

Primary Examiner—Lowell A. Larson
Attorney, Agent, or Firm—Morgan, Finnegan, Pine, Foley & Lee

[57] ABSTRACT

A method for working holes in metal which includes inserting into the hole a sleeve of metal having a shape memory O. D. slightly smaller than the hole to be worked, plastically expanding the sleeve in such hole with a mandrel and working the wall of such hole around the sleeve, allowing the sleeve to warm and shrink to its shape memory O. D. and removing the shrunken sleeve from the worked hole.

9 Claims, 1 Drawing Figure

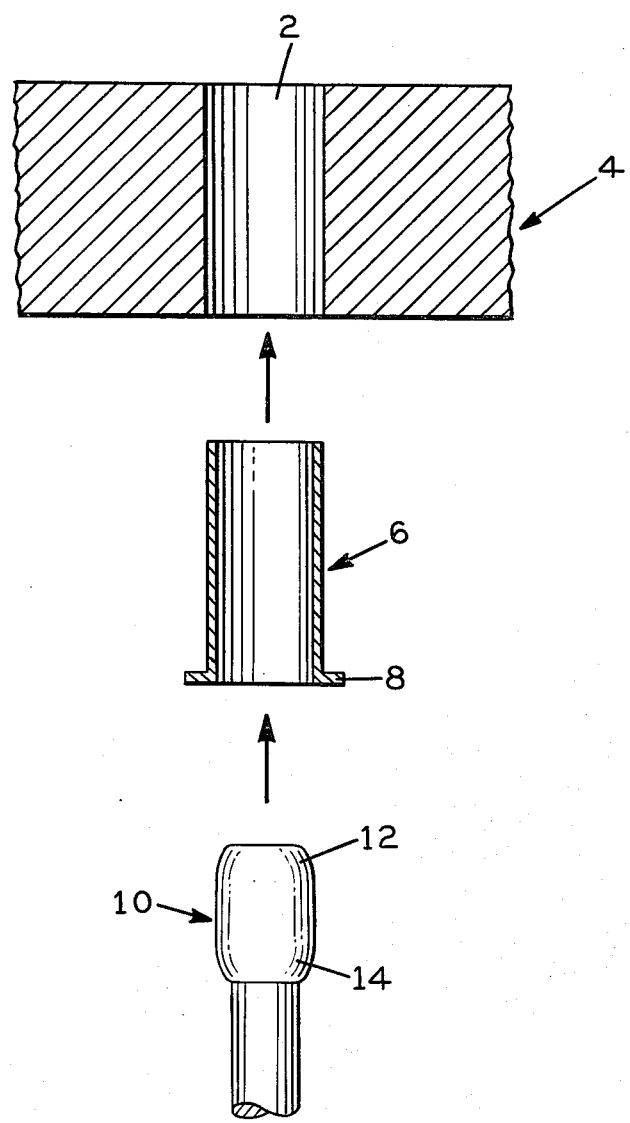

METHOD FOR WORKING HOLES

This invention relates to working of metals and, more particularly, to a method for the working or final sizing of holes, for example, holes in aluminum, magnesium, and alloys used in the structure of aircraft and aerospace vehicles.

It has long been the practice, in the fabrication and assembly of structures, such, for example, of aircraft and aerospace structures, to first drill or punch holes through the metal through which bolts, rivets, or fasteners are to pass and to then work the metal around the hole. Such working stretches the workpiece beyond the yield strength of the workpiece and increases the fatigue life of the structure about the hole by eliminating flaws or stress concentration points and by generating compressive stress gradients within the material about the worked hole. Because the greatest tensile stress concentration from external loading occurs at the hole surface, increased residual compression stress gradients increases the fatigue life of the structure.

One method heretofore followed in working of drilled or punched holes has been to force a ball having a diameter slightly larger than the hole through the hole, enlarging the hole and compressing the metal around the hole. Rather than using a ball, slotted collars or split sleeves and oversized mandrels have also been employed. In this arrangement, the slotted collar or split sleeve, having a relaxed diameter which will fit through the drilled hole, is placed in the hole, expanded with a slightly oversized mandrel and the mandrel is removed. The slotted collar or split sleeve springs back to its relaxed diameter, is removed from the hole and discarded.

In the instance of the oversized ball and the slotted collar or split sleeve and the oversized mandrel, in addition to compressing, stressing and increasing the strength and fatigue resistance around the hole, the oversized ball and collar or sleeve, where such collar or sleeve is used, distort or displace the metal. The oversized ball tends to force the metal through as well as radially outwardly of the hole. Thus, the ends of the hole wall are not square and must be subsequently machined or finished. In the case of the slotted collar or split sleeve, a ridge in the hole wall at the collar slot or sleeve split may be formed which must be removed by machining or finishing. Machining or finishing to square the hole wall or remove the ridge in the wall adds to the cost and, to a degree, reduces the advantages attained by working. The likelihood of fatigue related failures is increased.

In the instant invention, it has been discovered that working of holes can be substantially improved, the need for subsequent machining or finishing eliminated and the cost substantially reduced. It has been discovered that, by employing a full sleeve of a shape memory material, preformed and pretreated in a particular manner and by inserting such sleeve in the hole to be worked, the sleeve can be plastically expanded with a mandrel, the metal around the hole is worked and compression stressed and the sleeve can be warmed to a critical temperature where it shrinks and can be reused. Machining or finishing of the resulting worked hole is not necessary and the collar or sleeve may be plastically expanded and reused again and again by plastically expanding and heating to cause the sleeve to shrink to its memory shape.

In the instant invention, the full sleeve to be used in working is fabricated from a metal treated to have a memory shape, such as Nitinol nickel-titanium alloys or copper-zinc-aluminum alloys.

Nitinol is a family of nickel-titanium alloys having a chemical composition of from about 53% to 57% by weight of nickel and the balance titanium with small percentages of other elements added to adjust transformation temperature, e.g. iron or cobalt. It was developed by the U.S. Naval Ordnance Laboratory. Copper-zinc-aluminum alloys having about 70% by weight of copper and the balance zinc with small additions of aluminum have been developed by the International Copper Research Association.

In the practice of the instant invention, a sleeve of a shape memory alloy, having a transition temperature range between $-320°$ F. and $+300°$ F. is given a memory shape. It is then cooled below the transition temperature and inserted into the hole and expanded while still below the transition temperature. A mandrel having a diameter larger than the I.D. of the sleeve, which diameter combined with the thickness of the expanded sleeve will make up the diameter of the hole being worked, is inserted into the sleeve while in the hole and is forced through the sleeve. The mandrel passing through the sleeve further enlarges the sleeve and works the hole. The sleeve is then warmed up to above its critical transition temperature and, returns to its shrunken memory shape which, of course, is of a smaller O.D. than the I.D. of the worked hole, and is then removed from the worked hole.

After each use, the memory shape sleeve, at its memory shape, can be cooled below its transition temperature, inserted in a hole to be worked, enlarged with a mandrel forced through the memory shape sleeve, warmed above the critical temperature and shrink to its memory shape and the cycle can be repeated for the next hole to be worked.

The memory shape sleeve is continuous. Thus, there is no ridge to be removed nor edge to square. The sleeve is not discarded. Working is simplified and costs are reduced.

The invention of the instant application will be more fully understood from the following description of an embodiment of the invention taken with the appended drawing and illustrative example.

Referring to the drawing, hole 2 in metal member 4, such, for example, of heat treated aluminum alloy such as 7075-T6 Mil. Spec., is drilled and reamed to a hole size of 0.235 inches.

Sleeve 6 of Nitinol, having a shoulder 8 and a wall thickness of about 0.010 inches is memory shaped, in conventional manner, to an O.D. of 0.234 inches, placed in a liquid nitrogen bath, cooled to the bath temperature. The cooled sleeve 6, having an O.D. of 0.234 inches, an I.D. of 0.214 inches and a wall thickness of 0.010 inches is inserted into hole 2 of member 4 which may be a single plate or a plurality of plates to be bolted, riveted or otherwise fastened together. Cold sleeve 6 is inserted into hole 2 so that shoulder 8 contacts the surface of member 4. Mandrel 10 having tapered ends 12, 14 and a median portion of a diameter of 0.235 inches is inserted into sleeve 6 forced through the center of the sleeve to expand the I.D. of the sleeve to 0.235 inches, the diameter of the mandrel, and the O.D. of the sleeve to 0.255 inches. The expansion of sleeve 6 works and enlarges hole 2 from the drilled and reamed diameter of 0.235 inches to a worked diameter of 0.255 inches. Mandrel 10 is withdrawn and sleeve 6 is allowed to warm up to room temperature and return to its memory shape of 0.234 inches O.D. dimension. Sleeve 6 is then removed from the worked hole and can be recooled in liquid nitrogen, re-inserted into the next hole drilled and reamed to a hole size of 0.235 inches and again expanded with the mandrel to work the metal around such hole. After expanding and working, sleeve 6 is again allowed to warm up to room or ambient temperature and return to its memory shape and dimensions.

The process can be repeated and a number of holes can be worked using the same sleeve and mandrel. Warming up of the sleeve and the returning or shrinking of the sleeve to its original or memory size separates the sleeve from the wall of the worked hole and allows the Nitinol sleeve to be removed without damage to the sleeve or hole wall. Thus, the Nitinol sleeve can be recycled and reused and machining or other finishing of the worked hole is not required.

It is, of course, obvious that the hole to be worked may be of a different size than that described above. When the hole to be worked is of a different size, the size of the Nitinol sleeve and the mandrel with which the sleeve will be expanded are sized proportionately. The original or memory size or O.D. of the Nitinol sleeve should be slightly less than the size of the drilled hole to be worked and less than the size of the hole after working. This assures that the sleeve might be inserted and, when warmed to room temperature, withdrawn without damage to the sleeve or hole wall.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed:

1. A method for forming and working a hole through a workpiece comprising the steps of:
    forming a hole of fixed diameter through the workpiece;
    inserting through such hole a circular reusable sleeve of memory metal having a preset memory O.D. slightly less than the diameter of such hole to be worked and having a uniform wall thickness;
    inserting into the I.D. of said circular reusable sleeve a mandrel having an O.D. slightly larger than the I.D. of said reusable sleeve, the combined O.D. of said mandrel and wall thickness of said reusable sleeve is expanded equaling the diameter to which said hole is to be worked;
    forcing said mandrel through said reusable sleeve to expand said reusable sleeve and work said workpiece around said hole;
    removing said mandrel from said reusable sleeve;
    leaving said expanded reusable sleeve in said hole until said reusable sleeve contracts to said preset memory O.D.; and
    removing said contracted reusable sleeve from said worked hole.

2. A method, as recited in claim 1, in which said reusable sleeve of memory metal having a preset memory O.D. is cooled in a liquid nitrogen bath before said reusable sleeve is inserted in said hole to be worked.

3. A method, as recited in claim 1, in which said reusable sleeve of memory metal having a preset memory O.D. is cooled in a liquid nitrogen bath and the O.D. is slightly smaller than the diameter of the hole to be worked before said reusable sleeve is inserted in said hole to be worked.

4. A method, as recited in claim 1, in which said contracted reusable sleeve removed from said worked hole is inserted in a second hole formed at said fixed diameter through the workpiece and the method of claim 2 is repeated.

5. A method, as recited in claim 2, in which said contracted reusable sleeve removed from said worked hole is inserted in a second hole formed at said fixed diameter through the workpiece and the method of claim 2 is repeated.

6. A method, as recited in claim 3, in which said contracted reusable sleeve removed from said worked hole is inserted in a second hole formed at said fixed diameter through the workpiece and the method of claim 3 is repeated.

7. A method, as recited in each of claims 4, 5 or 6, in which said contracted reusable sleeve is removed from each of the worked holes in the workpiece and inserted in following holes to be worked in the workpiece and the method is repeated until all of the holes in the workpiece to be worked have been worked and said memory metal reusable sleeve is contracted and removed from the last worked hole.

8. A method, as recited in claim 1, in which the memory metal is a copper-zinc-aluminum alloy.

9. A method, as recited in claim 1, in which the memory metal is a nickel titanium alloy.

* * * * *